Figure 1:
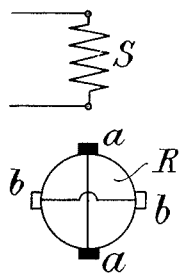

V. A. FYNN.
ALTERNATE CURRENT MOTOR.
APPLICATION FILED MAY 4, 1908.

1,038,337.

Patented Sept. 10, 1912.

2 SHEETS—SHEET 1.

WITNESSES:
René Ruine
William F. Martinez

INVENTOR:
Valère Alfred Fynn,
By Attorneys,

V. A. FYNN.
ALTERNATE CURRENT MOTOR.
APPLICATION FILED MAY 4, 1908.

1,038,337.

Patented Sept. 10, 1912.

2 SHEETS—SHEET 2.

WITH LARGE MAGNETIZING CURRENT

WITNESSES:
Rene Bruine
William F. Martinez

INVENTOR:
Valère Alfred Fynn,
By Attorneys,
Arthur C. Fraser & Usina

UNITED STATES PATENT OFFICE.

VALÈRE ALFRED FYNN, OF BLACKHEATH, ENGLAND.

ALTERNATE-CURRENT MOTOR.

1,038,337.　　　　　Specification of Letters Patent.　　Patented Sept. 10, 1912.

Application filed May 4, 1908. Serial No. 430,866.

*To all whom it may concern:*

Be it known that I, VALÈRE ALFRED FYNN, of 18 Blessington road, Blackheath, in the county of Kent, England, electrical engineer, have invented certain new and useful Improvements in or Relating to Alternate-Current Motors, of which the following is a specification.

This invention relates to single phase alternate current commutator motors of the type in which the electrical energy necessary for their operation is at least partly conveyed to the rotor by induction in which the field winding is at least partly disposed on the rotor and in which at least two rotor circuits the axes of which do not coincide are connected in series relation in a manner well understood, *i. e.*, either directly or with the interposition of a transformer. Such motors, as heretofore constructed, have a true series characteristic similar to that of continuous current series motors and their no-load or light load speed greatly exceeds their full load or normal working speed.

It is the object of this invention to reduce or limit the light-load or no-load speed of such motors relatively to their working speed by causing a negative torque to be produced in the machine after a certain predetermined speed has been reached so that the machine may be said to operate as a true series machine only at the moment of starting and at low speeds and may be said to lose its series characteristic more and more as the speed increases. To this end the phase of the rotor exciting current flowing along an axis displaced by about $180/n$ degrees from the axis of the transformer field is so chosen as to yield at a given speed the said negative torque in conjunction with the transformer field which as is known is made use of to convey to the rotor at least part of the energy necessary for the operation of the machine. In this way a machine is provided which will start with a powerful torque, like all series machines, but will not "race" at no load. This "racing" of a series-machine at no load is very objectionable in many cases such as lift work for instance, and is to be obviated in a novel manner by the present invention.

According to one modification the no-load speed may be limited by connecting at least two rotor circuits, the axes of which do not coincide in series relation by means of a transformer which may be of the variable ratio type and the magnetizing current of which is made large so as to make the phase difference between the primary and secondary currents of such a transformer considerably less than 180° when a given speed has been reached thereby creating a negative torque in the machine at a given speed. Means may be provided whereby the magnetizing current of said transformer may be varied either automatically or by hand. Heretofore it has always been the aim of the designer to make this magnetizing current small so as to keep said currents as nearly as possible in phase opposition.

According to another modification and which applies more particularly to motors in which the field winding is disposed partly on the rotor and partly on the stator these two parts of the field winding are connected in opposition so as to enable a negative torque to be secured at a given speed by causing the armature current to lead the E. M. F. to which it is due. In such cases a transformer may also be interposed between rotor circuits the axes of which do not coincide but its magnetizing current may be chosen either small or large and it may be of the variable ratio type or not.

In a further modification I combine with a motor, the no-load speed of which is limited in the novel manner herein described, known means for converting a motor in which the armature and field circuits are connected in series relation into a machine with a shunt characteristic. I may also compensate this converted motor in some known way. In cases where for the purposes of the present invention a transformer has been interposed between rotor circuits the axes of which do not coincide I may make use of that transformer for compensating the machine after it has been converted into a shunt motor. Rotor circuits connected in series relation may in such motors be referred to as armature and field circuits respectively when the axes of these circuits are displaced in space by $180/n$ degrees (where $n$ is the number of poles) and one of these axes coincides with the inducing stator winding; but, where the space position of the said axes differs from the above then although I still refer herein to these circuits as armature and field circuits respectively it will be understood that each of the said circuits may act partly as an armature and partly as a field circuit or winding.

Figure 2:
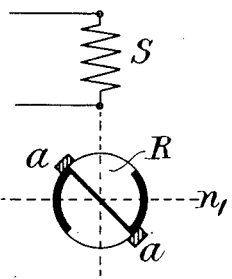
Figure 3:
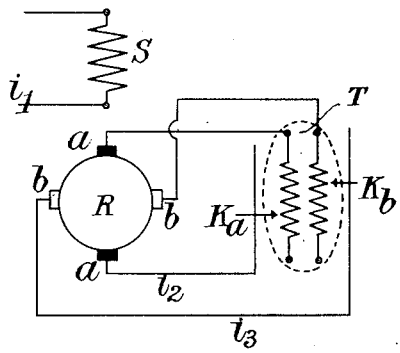
Figure 4:
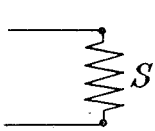
Figure 5:
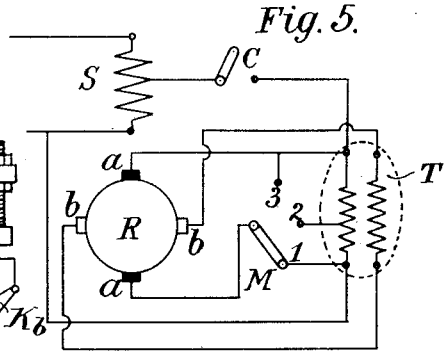
Figure 6:
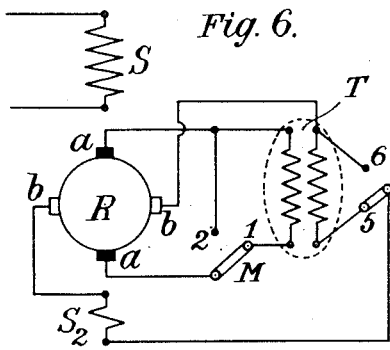
Figure 7:
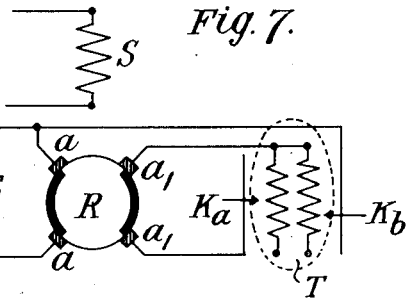
Figure 8:
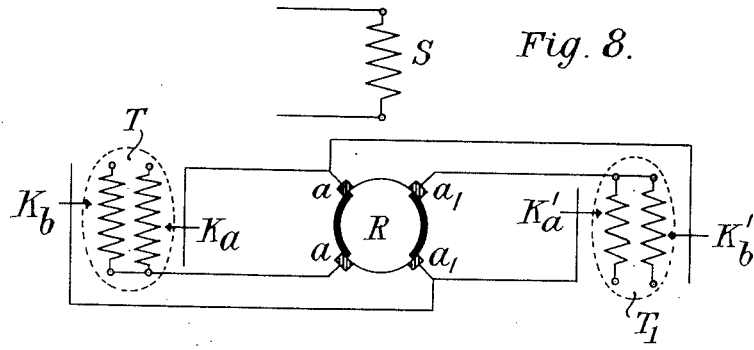
Figure 9:
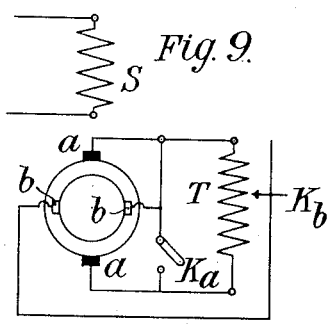
Figure 10:
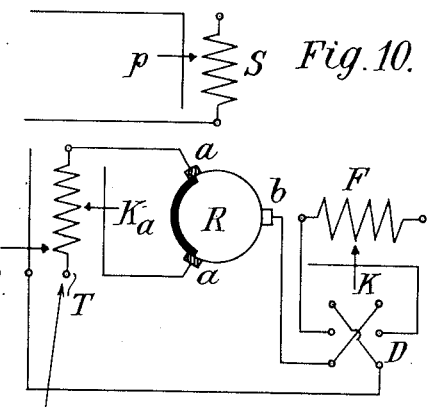
Figure 11:
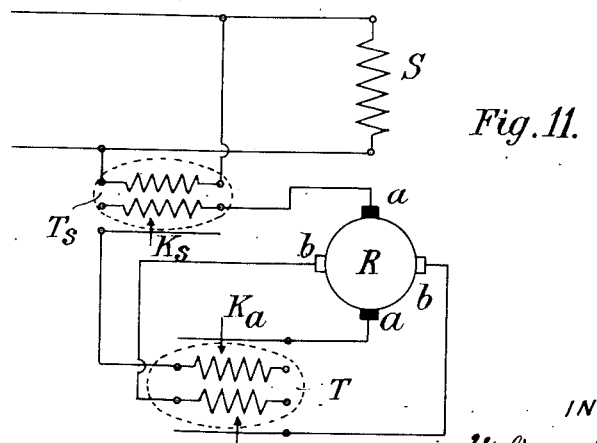

In further description I will refer to the drawings filed with this specification and where Figure 1. shows the known single-phase, self-excited, partly compensated shunt induction motor. Fig. 2. shows the known single-phase, self-excited, partly compensated series induction motor. Fig. 3. shows a transformer with a large magnetizing current as used for limiting the speed of a self-excited series induction motor. Fig. 4. shows means for converting the motor shown in Fig. 3. into a machine with a shunt characteristic. Fig. 5. shows means for compensating the motor shown in Fig. 4. after the latter has been converted. Fig. 6. shows other means for compensating the motor shown in Fig. 4. Fig. 7. shows a motor such as seen in Fig. 3. but in which the brushes are differently disposed on the commuator. Fig. 8. is a modification of Fig. 7. Fig. 9. shows the invention as applied to a motor with two distinct windings on the rotor. Fig. 10. gives one example of the invention as applied to a motor in which the field winding is disposed on the stator as well as on the rotor. Fig. 11. shows the invention as applied to an induction conduction motor.

In Fig. 1 is shown a partly compensated shunt induction motor. It is known that the machine as shown will not start but when brought up to speed it will operate best when the positions of the system of short circuited rotor brushes $a$ $a$ and $b$ $b$ relatively to the inducing or transformer stator winding S are as shown in Fig. 1. The same holds good if any other known system of short circuited brushes be disposed on the rotor. In Fig. 1 is shown one example in which the exciting E. M. F. is generated in the rotor. In this particular case this E. M. F. appears at the brushes $b$ $b$ and is due to the rotation of the rotor conductors in the transformer field due to S.

In Fig. 2 is shown a self-excited partly compensated series induction motor in which the E. M. F. responsible for the current producing the motor field along the axis $n_1$, is induced in the rotor by the transformer field due to S. It is known that the armature ampere turns are disposed along that portion of the rotor periphery which in Fig. 2 is indicated by heavy lines and that the field ampere turns lie on the remaining portions of the rotor periphery; armature and field turns are therefore connected in series relation and the same current i. e. that flowing from $a$ to $a$ and statically induced in the rotor traverses both windings. In this case a large starting torque is available but it is not possible to vary the field current independently of the armature current although it is possible to vary the ratio of armature to field ampere-turns by displacing the brushes $a$ $a$.

Fig. 3 shows a motor in which two rotor circuits the axes of which do not coincide are connected in series relation by way of a transformer T. The armature brushes are connected to the primary coil of the transformer T and this primary can be regulated at $K_a$. The secondary can be regulated at $K_b$ and is connected to the field brushes $b$ $b$. The E. M. F. induced in the rotor R at the brushes $a$ $a$ causes a current $i_2$ to flow through the primary of T. If the secondary is closed on the exciting brushes $b$ $b$ then a current $i_3$ will flow through that circuit whereby $i_3$ will be of nearly opposite phase to $i_2$ if the magnetizing current of the transformer T is small. The motor field will be nearly in phase with $i_3$ therefore nearly in phase with or of nearly opposite phase to $i_2$, according to the direction in which $i_3$ is sent through the rotor R. The ratio of $i_3$ to $i_2$ will depend on the transformation ratio of T. The current taken by the motor when switched on to the mains may be reduced to any desired value by adjusting the transformation ratio of T and the motor may be started as gradually as desired by the same means. When connected as shown the machine will have very nearly a true series characteristic and an objectionably high no-load speed unless the means hereinafter described are made use of for limiting the latter. At starting the motor will operate with two effective armature and two effective field axes per pole pair. The main torque $T_2$ of the motor will always be due at that time to the interaction of $i_2$ and $N_3$ if $N_3$ stands for the motor field along $b$ $b$ and which field is due to $i_3$. An auxiliary torque $T_3$ will be due to the interaction of $i_3$ and the transformer field $N_1$ due to S. The phase of $i_3$ depends on the phase of $i_2$ consequently it also depends on the phase relation of $i_2$ and that E. M. F. ($e_1$) which is induced at $a$ $a$ by $N_1$, it may therefore be said, when speaking approximately, that the auxiliary torque depends on the power factor of the motor decreasing with improving power factor. I have discovered that when $i_3$ is of practically opposite phase to $i_2$ as is the case when the magnetizing current of T in Fig. 3 is small, then the auxiliary torque is positive or in the same direction as the main torque when $i_2$ lags behind $e_1$. When $i_2$ is cophasal with $e_1$ then $T_3$ is zero and when $i_2$ leads $e_1$ then $T_3$ is negative. I make use of this discovery for the purpose of limiting the no-load speed of the motor forming the subject matter of this invention. In one modification and as applied to Fig. 3 I therefore according to this invention, make the magnetizing current of the transformer T large so that with increasing speed the phase difference between $i_2$ and $i_3$ becomes considerably less than 180°. The smaller this phase difference the sooner will that condition be reached where $T_3$ becomes negative when the motor will begin to lose its series characteristic. By making the magnetizing current of said transformer large it is easy to bring this condition about even before $i_2$ comes to lead $e_1$. Means may be provided for the purpose of varying the magnetizing current of said transformer. This magnetizing current may for instance be made small at starting and increased with increasing speed. The magnitude of this current may be affected by varying the number of the primary turns of the transformer as indicated in Fig. 3 at $K_a$ or by varying an air gap within the magnetic circuit as shown in Fig. 4 or in the like manner. I have also found that the phase of $i_2$ in this motor varies relatively to $e_1$ on the one hand with the speed and on the other with the apparent impedance of the rotor winding. The actual impedance of the rotor of course remains constant but the apparent impedance of that member which is equal to the actual impedance as long as the rotor is stationary, decreases as that E. M. F. ($e_{r_1}$) increases which is generated by rotation in the transformer field and in that part of the motor field winding which is disposed on the rotor. Since the phase difference between $i_2$ and $e_1$ not only depends on the speed but also on the magnitude of $e_{r_1}$ it becomes possible to adjust the value of the phase difference at a given speed by adjusting the magnitude of $e_{r_1}$ for that same speed. According to another modification of this invention the magnitude of $e_{r_1}$ can be adjusted with reference to the speed by suitably choosing the total effective number of turns of those windings which do duty as field windings and at least part of which must be disposed on the rotor. The phase of $i_2$ can thus be made to lead that of $e_1$, thereby producing a negative or speed limiting torque in the manner already set forth. When a transformer is interposed between rotor circuits the axes of which do not coincide, then its transformation ratio may or may not be simultaneously varied or adjusted. When therefore it is desired to limit the maximum possible speed of such a motor without converting it into a shunt induction machine then according to this invention part of the field winding is disposed on the stator and connected in opposition to that part of the field winding which is located on the rotor, the ratio of their ampere turns being so chosen that for a selected speed the magnitude of $e_{r_1}$ becomes such that $i_2$ leads $e_1$ by an amount sufficient to make $T_s$ equal and opposed to $T_2$ at that particular speed. An arrangement of this sort is useful in many instances thus for instance in the case of lifts. If that particular speed is exceeded the motor will act as a brake returning energy to the circuit.

The arrangement shown in Fig. 3 can also be used only for starting a motor as a machine with a series characteristic limited according to this invention and afterward converting same into one with a shunt characteristic such for instance as shown in Fig. 1. One way of carrying this modification into practice is shown in Fig. 4. At starting the switch M is on point 1 and the primary of T is in series with $a\ a$ when up to speed M is moved on to point 2 and the motor operates like a shunt induction motor. The primary of T may be switched out of circuit gradually or suddenly. Instead of being switched out the primary of T may be shortcircuited. The secondary may be treated similarly it being understood that as long as a part of T is left in circuit with $b\ b$ the motor speed will be above the synchronous. The direction of rotation may be reversed by reversing the connections between $a\ a$ and the primary of T or $b\ b$ and the secondary of T as shown at D in Fig. 4. As soon as the motor has been converted into a shunt induction machine in the manner stated its no-load speed will as is known be limited to a given value and as soon as the motor tends to exceed this value a negative torque will be developed in the machine.

The particular construction of the transformer T illustrated in Fig. 4 is intended only as a conventional showing of a transformer having an adjustable air gap and constitutes no part of my invention.

The transformer T may be further utilized to compensate the motor; one way of carrying this modification into practice is shown in Fig. 5, where the primary of T is also connected to part of the stator winding S. The point of tapping may be so chosen that when M stands on point 3 the motor is compensated to the desired amount. Switch C may be closed at starting or when the motor has reached a sufficient speed. It is not necessary to connect the primary of T to a part of S the material consideration is that this primary be connected to an E. M. F. of suitable magnitude and of about the same phase as the E. M. F. at the terminals of S.

A further modification consists in not using T for compensation but deriving the compensating E. M. F. from a winding disposed on the stator, such as $S_2$ in Fig. 6 where one way of carrying out this modification is illustrated. The motor will operate at practically constant speed when M is on point 2 and E on point 6.

It is not necessary that the brushes be disposed along two axes displaced by $180/n$ degrees (where $n=$ number of poles) and that one of these axes should correspond with that of S; any other arrangement of brushes which can be used with motors of the type described can also be employed when applying this invention.

The brush arrangement shown in Fig. 7 will also give very good results. The switch E is preferably closed when the motor has reached a sufficiently high speed and it is desired to convert same into a shunt induction machine.

A further example is shown in Fig. 8 which is really a duplication of Fig. 7.

In Fig. 9 is shown one example of a motor having two independent rotor windings, the one doing duty as armature ($a\ a$) the other as field winding ($b\ b$). The transformer T is here shown as being of the autotype and its primary may be shortcircuited at $K_a$.

In the example shown in Fig. 10 the field winding is partly disposed on the stator at F and there are by way of example three brushes per pole pair or their equivalent. Means are shown at K for regulating that part of the field winding which is disposed on the stator, this winding F may when desired be reversed for instance as shown at D. When it is desired to limit the maximum speed of this motor with or without the use of the series transformer T and without converting the motor into a shunt machine it will be necessary to connect F in opposition to that part of the field winding which is disposed on the rotor so as to make the re-actance of the effective field winding i. e. of a winding having a number of turns equal to the difference in the number of turns of the two parts of the field winding small as compared with that which would be due to those field turns only which are disposed on the rotor and in which $e_{r1}$ is generated by rotation in $N_1$. Means for regulating S are also shown at $p$, any other known and suitable means may be employed for this purpose. When the rotor winding is partly disposed on the stator then the transformer may in some instances be dispensed with if the rotor is provided, as is known with two separate windings in some such manner as was shown in Fig. 9.

The modification illustrated in Fig. 11 shows a motor in which the energy is conveyed to the rotor partly by induction from S and partly by conduction from the mains by way of example through the agency of the shunt transformer $T_s$ which may be regulated for instance at $K_s$ means may also be provided for reversing the direction of $T_s$ relatively to S. The transformer interposed between armature and field circuit of the rotor is shown at T and may be regulated at $K_a$ and $K_b$. Its magnetizing current is shown large and means may or may not be provided for regulating or altering said magnetizing current.

When the transformer employed for the purposes of this invention is embodied in the motor itself it must be so placed as not to be in effective inductive relation to either stator or rotor, thus if the flux of that transformer does induce E. M. F's in any of the windings these should cancel out at the terminals of said windings or of the motor.

Although all the examples given refer to two pole motors it will be understood that the invention is applicable to motors with any number of pole pairs. It is also to be understood that the modifications described in connection with one example may be made use of, as far as they apply in conjunction with any of the other examples thus the disposition of the field winding shown in Fig. 10 may be employed in all the examples.

The invention is not restricted to any particular type of rotor or stator windings.

What I claim and desire to secure by Letters Patent is:—

1. In an alternate current motor, the combination with an inducing member having a main inducing winding of an induced member closed along at least two axes, a series transformer requiring a large magnetizing current and linking the circuits of the induced member, means for varying the transformation ratio of said series transformer, and means for varying the magnetizing current required by said series transformer.

2. In an alternate current motor, the combination with an inducing member provided with a main inducing winding and a field winding displaced from said main inducing winding of an induced member, said induced member carrying two circuits connected in series relation with each other and with said field winding.

3. In an alternate current motor, the combination with an inducing member provided with a main inducing winding, of a field winding displaced from said main inducing winding, and an induced member, said induced member carrying two circuits connected in series relation with each other and with said field winding, and means for varying the magnitude of the magnetization due to said field winding.

4. In an alternate current motor, the combination with an inducing member provided with a main inducing winding, of a field winding displaced from said main inducing winding, and an induced member, said induced member carrying two circuits connected in series relation with each other and with said field winding, and means for reversing the direction of the magnetization due to said field winding.

5. In an alternate current motor, the combination with an inducing member provided with a main inducing winding, of a field winding displaced from said main inducing winding, and an induced member, said induced member carrying two circuits connected in series relation with each other and with said field winding, and means for varying the volts per turn in the main inducing winding.

6. In an alternate current motor, the combination with an inducing member provided with a main inducing winding and a field winding displaced from said main inducing winding of an induced member, said induced member carrying two circuits one of which includes said field winding, and a transformer connecting said circuits in series relation.

7. In an alternate current motor, the combination with an inducing member provided with a main inducing winding and a field winding displaced from said main inducing winding of an induced member, said induced member carrying two circuits one of which includes said field winding, a transformer connecting said circuits in series relation, and means for varying the magnitude of the magnetization due to said field winding.

8. In an alternate current motor, the combination with an inducing member provided with a main inducing winding and a field winding displaced from said main inducing winding of an induced member, said induced member carrying two circuits one of which includes said field winding, a transformer connecting said circuits in series relation, and means for varying the volts per turn in the main inducing winding.

In witness whereof, I have hereunto signed my name in the presence of two subscribing witnesses.

VALÈRE ALFRED FYNN.

Witnesses:
 ROBERT MILTON SPEARPOINT,
 H. D. JAMESON.